(12) United States Patent
Park et al.

(10) Patent No.: US 10,067,381 B2
(45) Date of Patent: Sep. 4, 2018

(54) LIGHT EMITTING MODULE, BACKLIGHT UNIT INCLUDING THE MODULE, AND DISPLAY APPARATUS INCLUDING THE UNIT

(71) Applicant: LG INNOTEK CO., LTD., Seoul (KR)

(72) Inventors: Sang Jun Park, Seoul (KR); Lee Im Kang, Seoul (KR); Chang Hyuck Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 298 days.

(21) Appl. No.: 14/928,051

(22) Filed: Oct. 30, 2015

(65) Prior Publication Data
US 2016/0131329 A1    May 12, 2016

(30) Foreign Application Priority Data
Nov. 7, 2014 (KR) ......................... 10-2014-0154195

(51) Int. Cl.
*F21V 5/00*    (2018.01)
*G02F 1/1335*    (2006.01)
*G02B 3/00*    (2006.01)

(52) U.S. Cl.
CPC ..... *G02F 1/133603* (2013.01); *G02B 3/0037* (2013.01); *G02F 2001/133607* (2013.01)

(58) Field of Classification Search
CPC ... G02F 1/133603; G02F 2001/133607; G02F 1/133604; G02B 3/0037
See application file for complete search history.

(56) References Cited

U.S. PATENT DOCUMENTS

| | | | |
|---|---|---|---|
| 6,972,439 B1 | 12/2005 | Kim et al. | |
| 7,300,183 B2 | 11/2007 | Kiyomoto et al. | |
| 2007/0195534 A1* | 8/2007 | Ha | B29C 33/005 362/327 |
| 2008/0007966 A1* | 1/2008 | Ohkawa | G02B 5/045 362/608 |
| 2010/0165640 A1* | 7/2010 | Lin | F21V 5/04 362/336 |
| 2011/0291131 A1* | 12/2011 | Ito | H01L 33/54 257/93 |

(Continued)

*Primary Examiner* — Elmito Breval
(74) *Attorney, Agent, or Firm* — Saliwanchik, Lloyd & Eisenschenk

(57) ABSTRACT

A light emitting module is disclosed. The light emitting module includes a board, a plurality of light emitting device packages mounted on the board while being spaced apart from each other, and a plurality of lenses located at upper surfaces of the light emitting device packages in a contact fashion, wherein each of the lenses includes a curved surface expressed by a start point (SP), an end point (EP), and two adjustment points (AP1 and AP2) of a Bezier curve represented as follows. SP=(x, z), EP=(x, Z_E), AP1=(X_01, Z_01), AP2=(X_02, Z_02) where x indicates positions in a direction intersecting a light axis, z indicates positions in a direction parallel to the light axis, SP is fixed, and 0.5 mm≤Z_E≤0.78 mm, 1.62 mm≤X_01≤1.8 mm, 1.44 mm≤Z_01≤1.5 mm, 0.19 mm≤X_02≤0.25 mm, and 1.06 mm≤Z_02≤1.26 mm, or X_01 is 1.0 mm, Z_01 is 0.9 mm, X_02 is 0.2 mm, Z_02 is 0.1 mm, and Z_E is 1.2 mm.

20 Claims, 13 Drawing Sheets

(56) References Cited

U.S. PATENT DOCUMENTS

| | | | |
|---|---|---|---|
| 2011/0303940 A1 | 12/2011 | Lee et al. | |
| 2012/0008322 A1* | 1/2012 | Lee | H01L 33/486 362/249.02 |
| 2012/0168798 A1* | 7/2012 | Park | H01L 33/58 257/98 |
| 2013/0161665 A1* | 6/2013 | Kuwaharada | H01L 33/54 257/88 |
| 2013/0208487 A1* | 8/2013 | Hsieh | F21V 13/04 362/310 |

* cited by examiner

LIGHT EMITTING MODULE, BACKLIGHT UNIT INCLUDING THE MODULE, AND DISPLAY APPARATUS INCLUDING THE UNIT

CROSS REFERENCE TO RELATED APPLICATION

This application claims priority under 35 U.S.C. § 119 to Korean Application No. 10-2014-0154195 filed on Nov. 7, 2014 which is hereby incorporated by reference in its entirety.

TECHNICAL FIELD

Embodiments relate to a light emitting module, a backlight unit including the module, and a display apparatus including the unit.

BACKGROUND

With the growth of metal organic chemical vapor deposition and molecular beam epitaxy of gallium nitride (GaN), red, green, and blue light emitting diodes (LEDs), capable of generating white light while exhibiting high luminance, have been developed.

The LEDs do not contain any material that causes environmental pollution, such as mercury (Hg), which is used in conventional lighting apparatuses such as incandescent lamps and fluorescent lamps. Consequently, LEDs exhibit excellent environment-friendly characteristics. In addition, the LEDs are characterized by a long lifespan and low power consumption. For these reasons, LEDs have replaced conventional light sources. In the field of LEDs, high efficiency, high output, and high luminance are critical.

In addition, a lens may be located on a conventional light emitting device package including LEDs. In this case, the lens is bonded to the light emitting device package using an adhesive. As a result, when a light emitting module is manufactured using a plurality of light emitting device packages, a defect rate may increase, and a manufacturing process may be complicated, whereby manufacturing cost and time may increase.

BRIEF SUMMARY

Embodiments provide a light emitting module, a backlight unit including the module, and a display apparatus including the unit.

In one embodiment, a light emitting module includes a board, a plurality of light emitting device packages mounted on the board while being spaced apart from each other, and a plurality of lenses located at upper surfaces of the light emitting device packages in a contact fashion, wherein each of the lenses includes a curved surface expressed by a start point (SP), an end point (EP), and two adjustment points (AP1 and AP2) of a Bezier curve represented as follows. SP=(x, z), EP=(x, Z_E), AP1=(X_01, Z_01), AP2=(X_02, Z_02) where x indicates positions in a direction intersecting a light axis, z indicates positions in a direction parallel to the light axis, SP is fixed, and 0.5 mm≤Z_E≤0.78 mm, 1.62 mm≤X_01≤1.8 mm, 1.44 mm≤Z_01≤1.5 mm, 0.19 mm≤X_02≤0.25 mm, and 1.06 mm≤Z_02≤1.26 mm, or X_01 is 1.0 mm, Z_01 is 0.9 mm, X_02 is 0.2 mm, Z_02 is 0.1 mm, and Z_E is 1.2 mm.

x of the start point (SP) may be 1.5 mm, and z of the start point (SP) may be 0. X_01 may be 1.7 mm, Z_01 may be 1.45 mm, X_02 may be 0.2 mm, Z_02 may be 1.1 mm, and Z_E may be 0.6 mm.

For example, the lenses may have the same shape or different shapes.

For example, at least one of the lenses may have a hemispheric shape or a hemispheric shape with a recess formed at the upper part thereof. The lens having the recess may be symmetric with the light axis in a direction intersecting the light axis. The recess may be located on the light axis, and may be concave toward the center of a corresponding one of the light emitting device packages. Alternatively, at least one of the lenses may have a truncated hemispheric shape.

For example, the board may have recesses defining lens areas, and each of the lenses may be located in a corresponding one of the lens areas.

For example, the light emitting device packages may be arranged at the same interval, and the lenses may have the same width. Alternatively, the light emitting device packages may be arranged at different intervals, and the lenses may have different widths.

For example, the lenses may be arranged at the same interval or different intervals.

For example, the lenses may be arranged so as to surround the light emitting device packages. The lower surfaces of the lenses may contact the upper surface of the board and the upper surfaces of the light emitting device packages.

Alternatively, the lower surfaces of the lenses may be spaced apart from the upper surface of the board.

In another embodiment, a backlight unit includes the light emitting module, a reflection unit located under the light emitting module, and a diffusion unit located on the light emitting module.

In a further embodiment, a display apparatus includes the backlight unit and a display panel located on the backlight unit.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
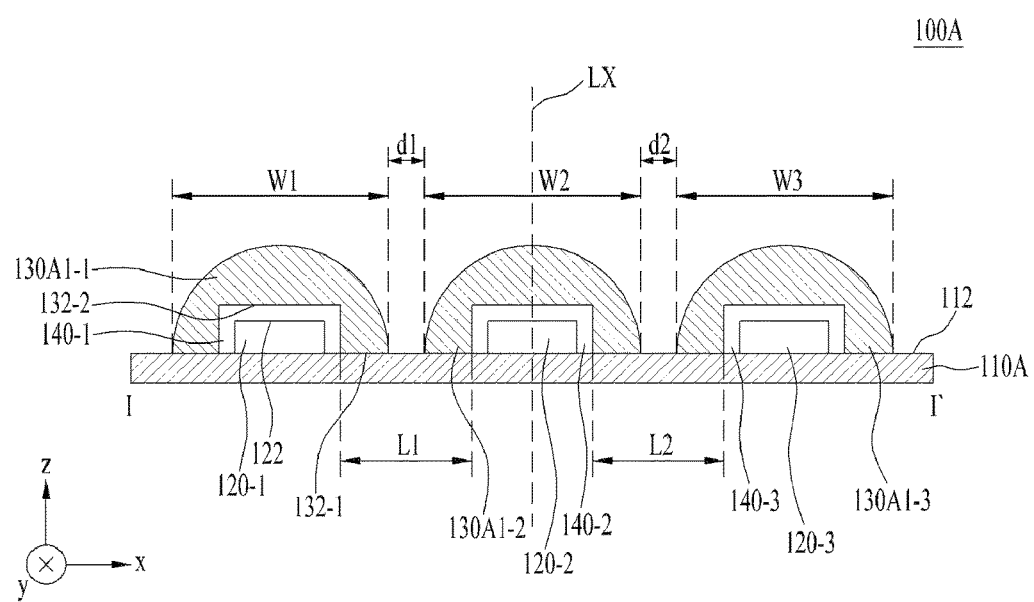
FIG. 1 is a sectional view showing a light emitting module according to an embodiment.

Reference will now be made in detail to the preferred embodiments, examples of which are illustrated in the accompanying drawings. However, embodiments may be modified into various other forms. Embodiments are not restrictive but are illustrative. Embodiments are provided to more completely explain the disclosure to a person having ordinary skill in the art.

It will be understood that when an element is referred to as being 'on' or 'under' another element, it can be directly on/under the element, and one or more intervening elements may also be present. When an element is referred to as being 'on' or 'under', 'under the element' as well as 'on the element' can be included based on the element.

In addition, relational terms, such as 'first' and 'second' and 'upper part' and 'lower part', are used only to distinguish between one subject or element and another subject and element without necessarily requiring or involving any physical or logical relationship or sequence between such subjects or elements.

In the drawings, the thicknesses or sizes of respective layers (or respective parts) are exaggerated, omitted, or schematically illustrated for convenience and clarity of description. Further, the sizes of the respective elements do not denote the actual sizes thereof.

Figure 2:
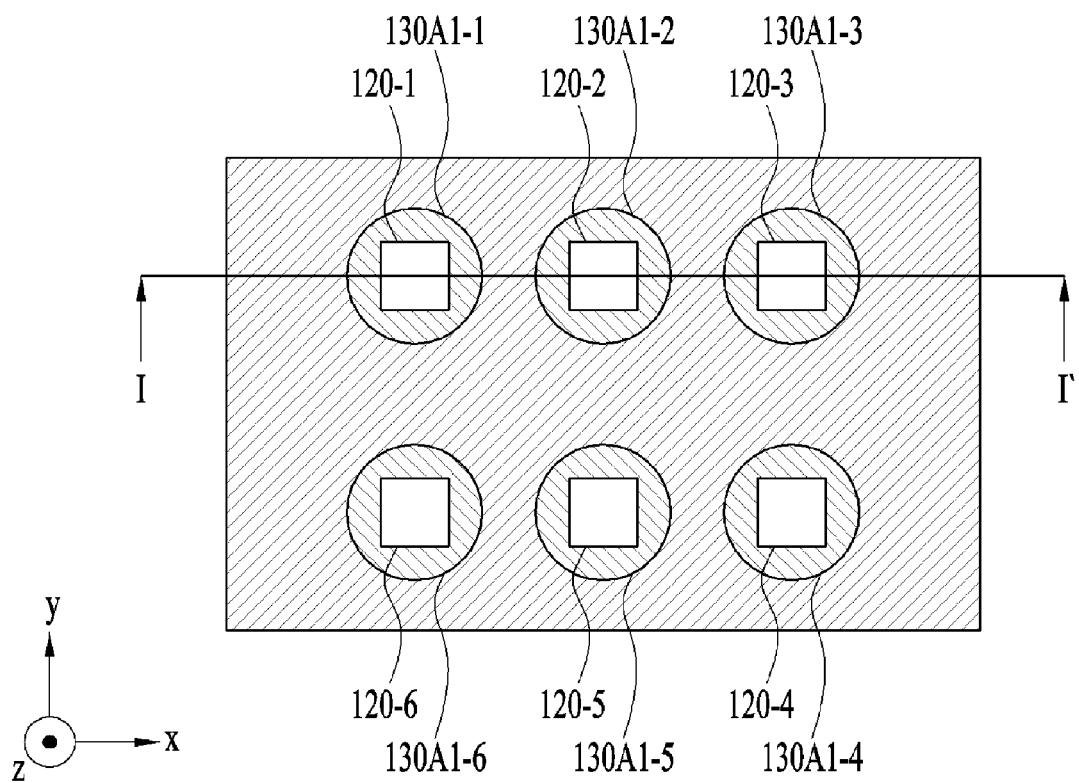
FIG. 2 is a plan view of the light emitting module shown in FIG. 1.

FIG. 1 is a sectional view showing a light emitting module 100A according to an embodiment, and FIG. 2 is a plan view of the light emitting module 100A shown in FIG. 1. FIG. 1 is a partial sectional view taken along line I-I' of FIG. 2. However, the light emitting module 100A according to the embodiment shown in FIG. 1 is not limited by the plan view of FIG. 2.

The light emitting module 100A shown in FIGS. 1 and 2 may include a board 110A, a plurality of light emitting device packages 120-1 to 120-6, and a plurality of lenses 130A1-1 to 130A1-6.

In FIG. 2, six light emitting device packages 120-1 to 120-6 and six lenses 130A1-1 to 130A1-6 are shown for the convenience of description. However, the disclosure is not limited thereto. For example, more than or less than six light emitting device packages may be provided, and a number of lenses corresponding to the number of the light emitting device packages may be provided. However, the embodiments are not limited thereto.

The light emitting device packages 120-1 to 120-6 may be mounted on the board 110A such that the light emitting device packages 120-1 to 120-6 are spaced apart from each other. The board 110A may be configured by printing a circuit pattern on an insulator. For example, the board 110A may include a general printed circuit board (PCB), a metal core PCB, a flexible PCB, or a ceramic PCB.

Based on a direction in which a light emission surface is directed, each of the light emitting device packages 120-1 to 120-6 may be classified as a top view type light emitting device package or a side view type light emitting device package. Hereinafter, each of the light emitting device packages 120-1 to 120-6 will be described as a top view type light emitting device package, in which a light emission surface is directed upward. However, the following description will also be applied to a side view type light emitting device package.

In addition, each of the light emitting device packages 120-1 to 120-6 may include a color light emitting device (LED) that emits at least one selected from among red, blue, and green, or a white LED. The color LED may include at least one selected from among a red LED, a blue LED, and a green LED.

Figure 3:
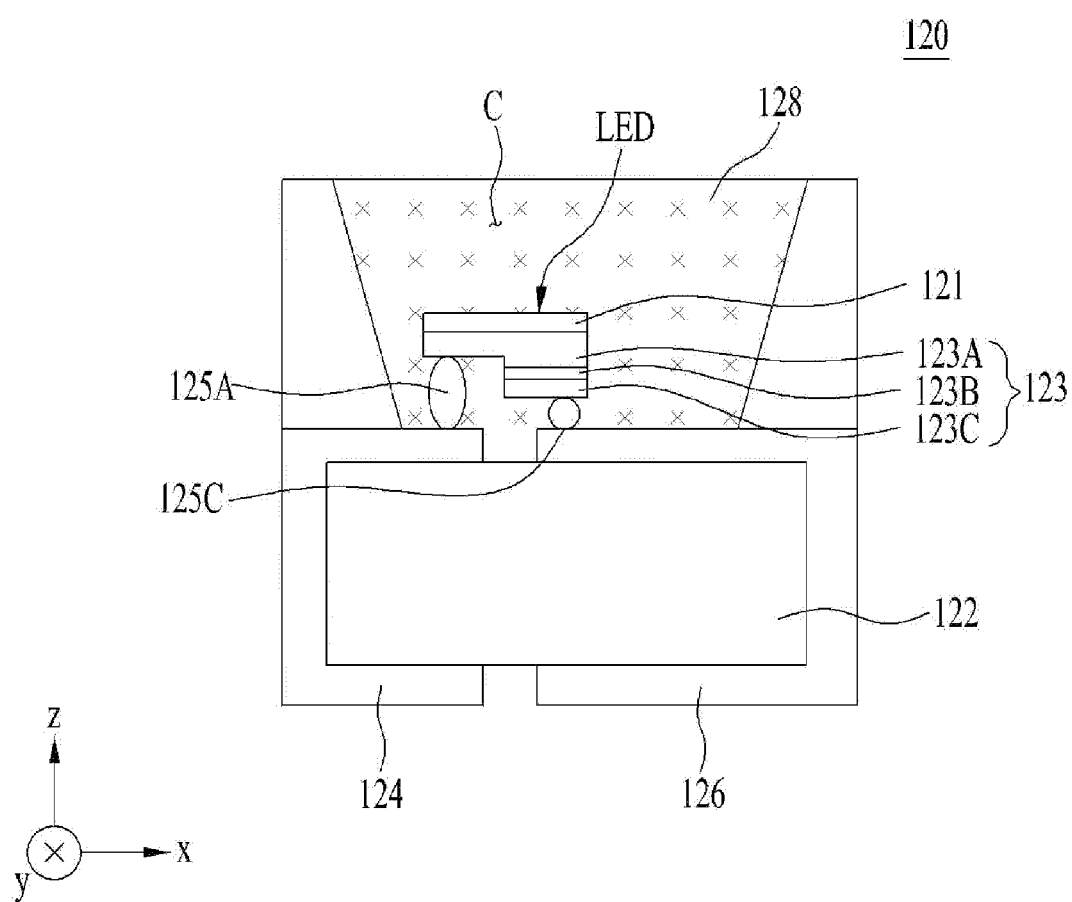
FIG. 3 is an exemplary sectional view showing each light emitting device package shown in FIGS. 1 and 2.

FIG. 3 is an exemplary sectional view showing each of the light emitting device packages 120-1 to 120-6 shown in FIGS. 1 and 2.

For example, as shown in FIG. 3, each of the light emitting device packages 120-1 to 120-6 (denoted by 120) may include a package body 122, first and second lead frames 124 and 126, a molding member 128, and a light emitting device (LED).

The LED may include a device substrate 121, a light emitting structure 123, and first and second bumps 125A and 125C.

The device substrate 121 may be made of a material, such as a carrier wafer, suitable for growing a semiconductor material. In addition, the device substrate 121 may be made of a material exhibiting high thermal conductivity. The device substrate 121 may be a conductive substrate or an insulative substrate. For example, the device substrate 121 may be made of a material including at least one selected from among sapphire ($Al_2O_3$), GaN, SiC, ZnO, Si, GaP, InP, $Ga_2O_3$, and GaAs. Although not shown, a concave and convex pattern may be formed on the lower surface of the device substrate 121.

The light emitting structure 123 may be a structure in which a first conductive semiconductor layer 123A, an active layer 123B, and a second conductive semiconductor layer 123C are sequentially stacked under the device substrate 121.

The first conductive semiconductor layer 123A may be made of a semiconductor compound. The first conductive semiconductor layer 123A may be made of a group III-V or group II-VI compound semiconductor. The first conductive semiconductor layer 123A may be doped with a first conductive dopant.

For example, the first conductive semiconductor layer 123A may be made of a semiconductor having a chemical formula of $In_xAl_yGa_{1-x-y}N$ ($0 \leq x \leq 1$, $0 \leq y \leq 1$, $0 \leq x+y \leq 1$). For example, the first conductive semiconductor layer 123A may include any one selected from among InAlGaN, GaN, AlGaN, InGaN, AlN, and InN. The first conductive semiconductor layer 123A may be doped with an n-type dopant (e.g. Si, Ge, or Sn).

The active layer 123B may be located between the first conductive semiconductor layer 123A and the second conductive semiconductor layer 123C. The active layer 123B may generate light using energy generated during the recombination of electrons and holes provided from the first conductive semiconductor layer 123A and the second conductive semiconductor layer 123C, respectively.

The active layer 123B may be made of a semiconductor compound, such as a group III-V or group II-VI compound semiconductor. The active layer 123B may have a double junction structure, a single well structure, a multiple well structure, a quantum wire structure, or a quantum dot structure.

In a case in which the active layer 123B has a quantum well structure, the active layer 123B may have a single or quantum well structure including a well layer having a chemical formula of $In_xAl_yGa_{1-x-y}N$ (0≤x≤1, 0≤y≤1, 0≤x+y≤1) and a barrier layer having a chemical formula of $In_aAl_bGa_{1-a-b}N$ (0≤a≤1, 0≤b≤1, 0≤a+b≤1). The well layer may be made of a material having a lower band gap than the energy band gap of the barrier layer.

The second conductive semiconductor layer 123C may be made of a semiconductor compound. The second conductive semiconductor layer 123C may be made of a group III-V or group II-VI compound semiconductor. The second conductive semiconductor layer 123C may be doped with a second conductive dopant.

For example, the second conductive semiconductor layer 123C may be made of a semiconductor having a chemical formula of $In_xAl_yGa_{1-x-y}N$ (0≤x≤1, 0≤y≤1, 0≤x+y≤1). For example, the second conductive semiconductor layer 123C may include any one selected from among GaN, AlN, AlGaN, InGaN, InN, InAlGaN, AlInN, AlGaAs, GaP, GaAs, GaAsP, and AlGaInP. The second conductive semiconductor layer 123C may be doped with a p-type dopant (e.g. Mg, Zn, Ca, Sr, or Ba).

A portion of the first conductive semiconductor layer 123A of the light emitting structure 123 may be exposed. That is, the second conductive semiconductor layer 123C, the active layer 123B, and a part of the first conductive semiconductor layer 123A of the light emitting structure 123 may be etched such that a portion of the first conductive semiconductor layer 123A is exposed. An exposed surface of the first conductive semiconductor layer 123A, which is exposed by mesa etching, may be higher than the upper surface of the active layer 123B.

A conductive clad layer (not shown) may be located between the active layer 123B and the first conductive semiconductor layer 123A or between the active layer 123B and the second conductive semiconductor layer 123C. The conductive clad layer may be made of a nitride semiconductor (e.g. AlGaN).

A first electrode (not shown) may be located between the first conductive semiconductor layer 123A and the first bump 125A, and a second electrode (not shown) may be located between the second conductive semiconductor layer 123C and the second bump 125C.

The first bump 125A may be located between the first electrode and the first lead frame 124, and the second bump 125C may be located between the second electrode and the second lead frame 126.

The first and second lead frames 124 and 126 may be spaced apart from each other in a direction perpendicular to a thickness direction of the light emitting structure 123, i.e. an x-axis direction. Consequently, the first and second lead frames 124 and 126 may be electrically separated from each other. Each of the first and second lead frames 124 and 126 may be made of a conductive material, such as metal. However, the disclosure is not limited to a specific type of material of which each of the first and second lead frames 124 and 126 is made.

The package body 122 may define a cavity C. For example, as shown in FIG. 3, the package body 122 may define the cavity C together with the first and second lead frames 124 and 126. That is, the cavity C may be defined by a lateral surface of the package body 122 and upper surfaces of the first and second lead frames 124 and 126. The package body 122 may be made of an epoxy molding compound (EMC). However, the disclosure is not limited to a specific material of which the package body 122 is made.

The molding member 128 may surround and protect the LED. The molding member 128 may be made of, for example, silicon (Si). The molding member 128 may include a fluorescent substance to change the wavelength of the light emitted from the LED. The fluorescent substance may include any one selected from among a YAG fluorescent material, a TAG fluorescent material, a silicate fluorescent material, a sulfide fluorescent material, and a nitride fluorescent material, which are wavelength conversion means for converting light generated from the LED into white light. However, the disclosure is not limited to a specific type of the fluorescent material.

As the YAG or TAG fluorescent material, any one may be selected from among (Y, Tb, Lu, Sc, La, Gd, Sm)3(Al, Ga, In, Si, Fe)5(O, S)12:Ce. As the silicate fluorescent material, any one may be selected from among (Sr, Ba, Ca, Mg)2SiO4:(Eu, F, Cl).

In addition, as the sulfide fluorescent material, any one may be selected from among (Ca,Sr)S:Eu, (Sr,Ca,Ba)(Al, Ga)2S4:Eu. As the nitride fluorescent material, any one may be selected from among (Sr, Ca, Si, Al, O)N:Eu (e.g. CaAlSiN4:Eu β-SiAlON:Eu) and Ca-α SiAlON:Eu (Cax, My)(Si,Al)12(O,N)16 (where M is at least one selected from among Eu, Tb, Yb, and Er; 0.05<(x+y)<0.3, 0.02<x<0.27, and 0.03<y<0.3).

A nitride fluorescent substance including N (e.g. CaAlSiN3:Eu) may be used as a red fluorescent substance. The nitride red fluorescent substance exhibits higher resistance to external environment such as heat or moisture and lower discoloration than the sulfide fluorescent substance.

The LED has a flip-chip bonding structure. However, the disclosure is not limited thereto. Unlike what is shown in FIG. 3, the LED may be configured to have a horizontal bonding structure or a vertical bonding structure.

Referring back to FIGS. 1 and 2, the lenses 130A1-1 to 130A1-6 may be located respectively on the light emitting device packages 120-1 to 120-6 in a contact fashion. That is, the first lenses 130A1-1 may be located on the first light emitting device package 120-1, the second lenses 130A1-2 may be located on the second light emitting device package 120-2, the third lenses 130A1-3 may be located on the third light emitting device package 120-3, the fourth lenses 130A1-4 may be located on the fourth light emitting device package 120-4, the fifth lenses 130A1-5 may be located on the fifth light emitting device package 120-5, and the sixth lenses 130A1-6 may be located on the sixth light emitting device package 120-6.

Each of the lenses 130A1-1 to 130A1-6 may include a curved surface expressed by a start point SP, an end point EP, and two adjustment points AP1 and AP2 of a Bezier curve represented by Equation 1.

$$SP=(x,z),$$

$$EP=(x,Z\_E),$$

$$AP1=(X\_01,Z\_01),$$

$$AP2=(X\_02,Z\_02) \quad \text{[Equation 1]}$$

Where x indicates positions in a direction intersecting a light axis LX (e.g. a direction perpendicular to the light axis LX, i.e. an x-axis direction), and z indicates positions on the light axis LX or in a direction parallel to the light axis LX (e.g. a z-axis direction).

The start point SP may be fixed. For example, x of the start point SP may be 1.5 mm, and z of the start point SP may be 0. In addition, 0.5 mm≤Z_E≤0.78 mm, 1.62 mm≤X_01≤1.8 mm, 1.44 mm≤Z_01≤1.5 mm, 0.19 mm≤X_02≤0.25 mm, and 1.06 mm≤Z_02≤1.26 mm.

Figure 4:
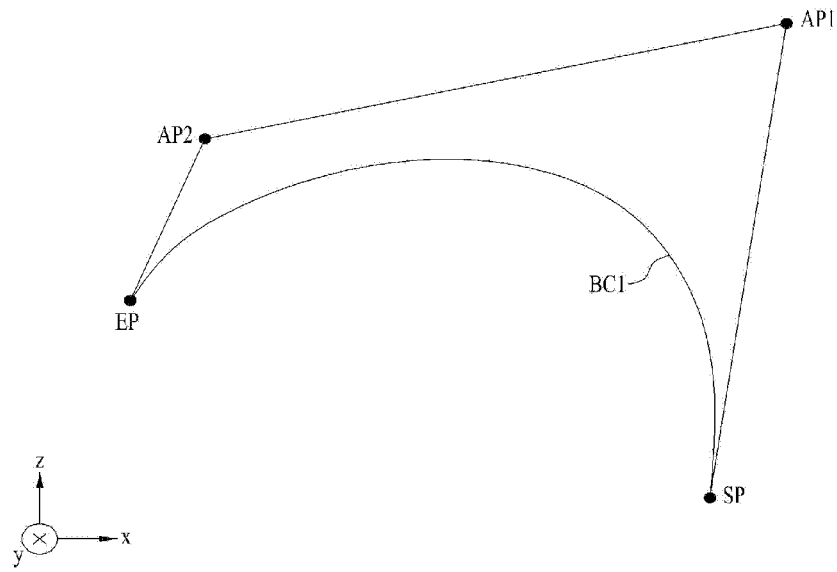
FIG. 4 is a view showing a first curved surface according to an embodiment, expressed by a Bezier curve.
Figure 5:
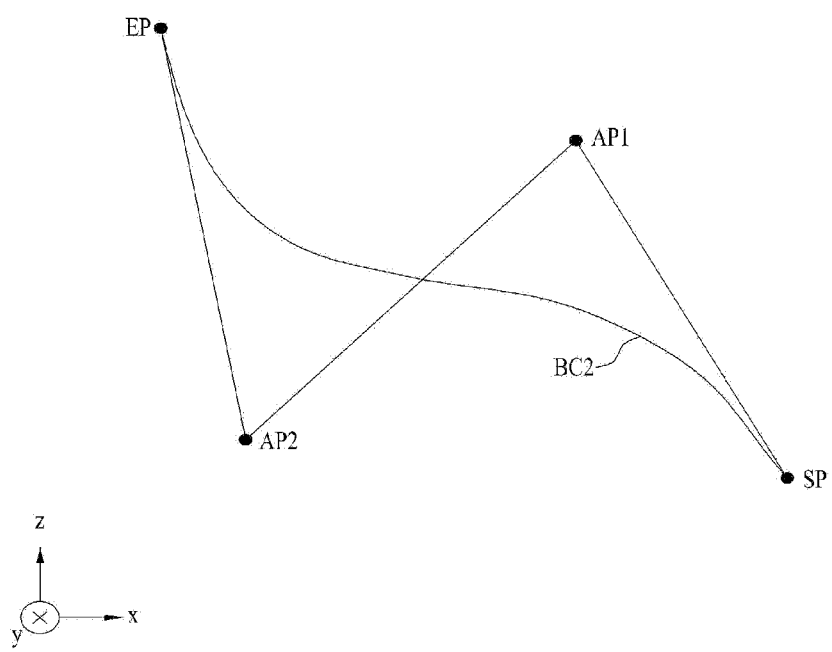
FIG. 5 is a view showing a second curved surface according to another embodiment, expressed by a Bezier curve.

FIG. 4 is a view showing a first curved surface BC1 according to an embodiment expressed by a Bezier curve, and FIG. 5 is a view showing a second curved surface BC2 according to another embodiment expressed by a Bezier curve.

Referring to FIG. 4, at an end point EP and two adjustment points AP1 and AP2 of a Bezier curve expressing a curved surface which may be included in each of the lenses 130A1-1 to 130A1-6, X_01 may be 1.7 mm, Z_01 may be 1.45 mm, X_02 may be 0.2 mm, Z_02 may be 1.1 mm, and Z_E may be 0.6 mm.

Referring to FIG. 5, at an end point EP and two adjustment points AP1 and AP2 of a Bezier curve expressing a curved surface which may be included in each of the lenses 130A1-1 to 130A1-6, X_01 may be 1.0 mm, Z_01 may be 0.9 mm, X_02 may be 0.2 mm, Z_02 may be 0.1 mm, and Z_E may be 1.2 mm.

As previously described, each of the lenses 130A1-1 to 130A1-6 including a curved surface which may be expressed by a Bezier curve may have various shapes.

For example, in the light emitting module 100A shown in FIGS. 1 and 2, each of the lenses 130A1-1 to 130A1-6 may have a hemispheric (or dome) shape. However, the disclosure is not limited thereto. The lenses 130A1-1 to 130A1-6 may have various shapes.

Figure 6A:
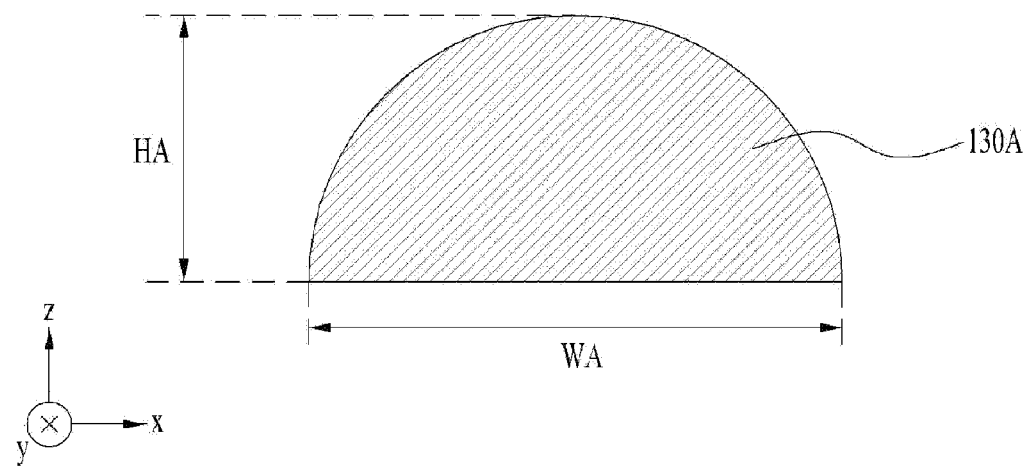
FIGS. 6A to 6C are sectional views showing each of a plurality of lenses shown in FIGS. 1 and 2.
Figure 6B:
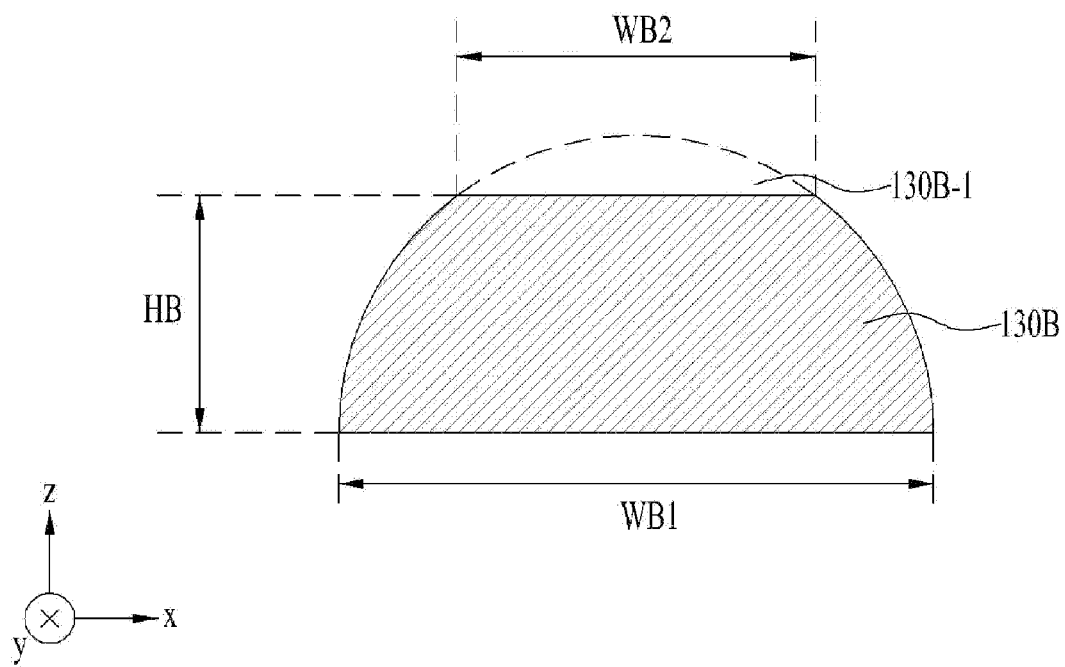
Figure 6C:
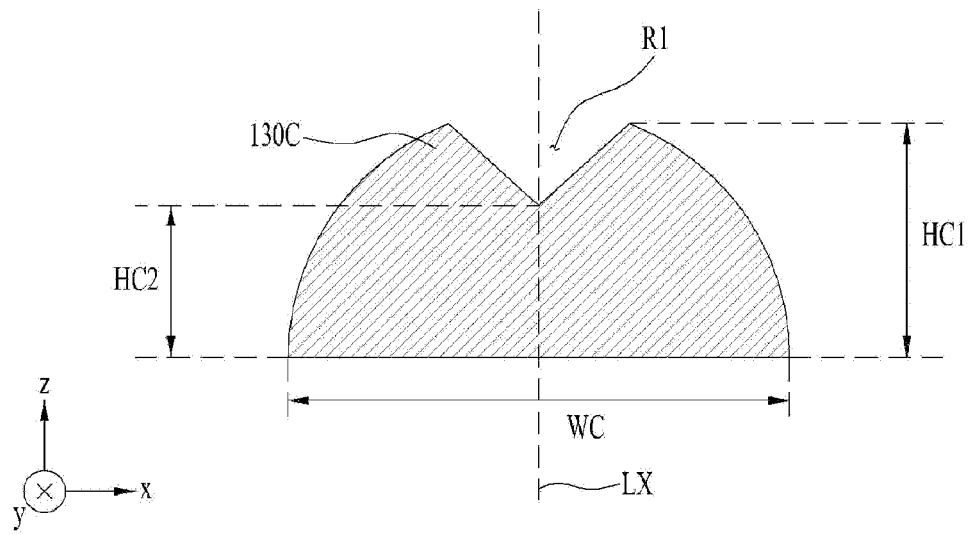

FIGS. 6A to 6C are sectional views showing each of the lenses 130A1-1 to 130A1-6 shown in FIGS. 1 and 2.

As shown in FIG. 6A, a lens 130 A may have a hemispheric shape. In this case, each of the hemispheric lenses 130A1-1 to 130A1-6 may have a first width WA of 3 mm in the x-axis direction, and may have a first height HA of 1.31 mm in the z-axis direction. However, the disclosure is not limited thereto.

Alternatively, as shown in FIG. 6B, a lens 130B may have a truncated hemispheric shape. That is, the truncated hemispheric shape shown in FIG. 6B may be obtained by cutting a head portion 130B-1 from the hemispheric lens 130A shown in FIG. 6A. In this case, the lower surface of the truncated hemispheric lens 130B may have a 2-1 width WB1 of 3 mm in the x-axis direction, the upper surface of the truncated hemispheric lens 130B may have a 2-2 width WB2 of 1.28 mm in the x-axis direction, and the truncated hemispheric lens 130B may have a second height HB of 1 mm in the z-axis direction. However, the disclosure is not limited thereto.

Alternatively, as shown in FIG. 6C, a lens 130C may have a hemispheric shape with a recess R1 formed at the upper part thereof. The recess R1 may be located on the light axis LX, and may have a shape that is concave (i.e. recessed) toward the center of a corresponding light emitting device package 120. In addition, the lens 130C having the recess R1 may be symmetric with the light axis LX in a direction intersecting the light axis LX (e.g. in at least one of the x-axis or y-axis directions perpendicular to the light axis LX).

The lens 130C shown in FIG. 6C may have a parabolic shape from the center to the edge thereof. In this case, the hemispheric lens 130C having the recess R1 may have a third width WC of 3 mm in the x-axis direction, may have a 3-1 height HC1 of 1.1 mm in the z-axis direction, and may have a 3-2 height HC2 of 0.79 mm from the bottom surface of the lens 130C to the recess R1 in the z-axis direction. However, the disclosure is not limited to a specific value of width or height. For example, the third width WC may mean the width of the lower surface of the lens 130C, the 3-1 height HC1 may mean the maximum height of the lens 130C, and the 3-2 height HC2 may mean the height of the lens 130C to an apex of the recess. However, the disclosure is not limited thereto.

In FIGS. 1 and 2, each of the lenses 130A1-1 to 130A1-6 is shown as having the hemispheric shape shown in FIG. 6A. However, the disclosure is not limited thereto. Each of the lenses 130A1-1 to 130A1-6 shown in FIGS. 1 and 2 may have the shape shown in FIG. 6B or 6C.

In addition, the lenses 130A1-1 to 130A1-6 shown in FIGS. 1 and 2 may have the same shape or different shapes. For example, the first lenses 130A1-1 may have the shape shown in FIG. 6A, the second lenses 130A1-2 may have the shape shown in FIG. 6B, and the third lenses 130A1-3 may have the shape shown in FIG. 6C.

In addition, each of the lenses 130A1-1 to 130A1-6 shown in FIGS. 1 and 2 may be made of a material including silicon.

In addition, the light emitting device packages 120-1 to 120-6 may be mounted on the board 110A while being spaced apart from each other by the same distance (or pitch) L1 and L2, and widths W1, W2, and W3 of the lenses 130A1-1 to 130A1-6 may be the same.

Alternatively, the light emitting device packages 120-1 to 120-6 may be mounted on the board 110A while being spaced apart from each other by different distances L1 and L2, and the widths W1, W2, and W3 of the lenses 130A1-1 to 130A1-6 may be different.

Alternatively, the light emitting device packages 120-1 to 120-6 may be mounted on the board 110A while being spaced apart from each other by the same distance L1 and L2, and the widths W1, W2, and W3 of the lenses 130A1-1 to 130A1-6 may be different.

In addition, the light emitting device packages 120-1 to 120-6 may be mounted on the board 110A while being spaced apart from each other by different distances L1 and L2, and the widths W1, W2, and W3 of the lenses 130A1-1 to 130A1-6 may be the same.

In addition, the lenses 130A1-1 to 130A1-6 may be mounted on the board 110A while being spaced apart from each other by the same distance or different distances d1 and d2.

The distances between the light emitting device packages 120-1 to 120-6 may be set in consideration of wavelength conversion units 140-1, 140-2, and 140-3, which will hereinafter be described.

In addition, the light emitting module 100A shown in FIG. 1 may further include wavelength conversion units 140-1, 140-2, and 140-3. The wavelength conversion units 140-1, 140-2, and 140-3 may be arranged so as to surround the light emitting device packages 120-1, 120-2, and 120-3, respectively. The wavelength conversion units 140-1, 140-2, and 140-3 may be formed respectively at upper and lateral surfaces of the light emitting device packages 120-1, 120-2, and 120-3 so as to conform therewith. The wavelength conversion units 140-1, 140-2, and 140-3 may serve to convert the wavelength of light emitted from the light emitting device packages 120-1, 120-2, and 120-3, respectively. To this end, each of the wavelength conversion units 140-1, 140-2, and 140-3 may include a fluorescent substance, as in the molding member 128 shown in FIG. 3.

That is, the wavelength of light may be primarily converted by the molding member 128 shown in FIG. 3, and may be secondarily converted by each of the wavelength conversion units 140-1, 140-2, and 140-3. According to circumstances, the wavelength conversion units 140-1, 140-2, and 140-3 may be omitted. In the following description, the wavelength conversion units 140-1, 140-2, and 140-3 are omitted for the convenience of description.

In addition, as shown in FIG. 1, the lenses 130A1-1 to 130A1-3 may be arranged so as to surround the light emitting device packages 120-1 to 120-3, respectively. In this case, a first lower surface 132-1 of each of the lenses 130A1-1 to 130A1-3 may contact an upper surface 112 of the board 110A, and a second lower surface 132-2 of each of the lenses 130A1-1 to 130A1-3 may contact an upper surface 122 of a corresponding one of the light emitting device packages 120-1 to 120-3.

Figure 7:
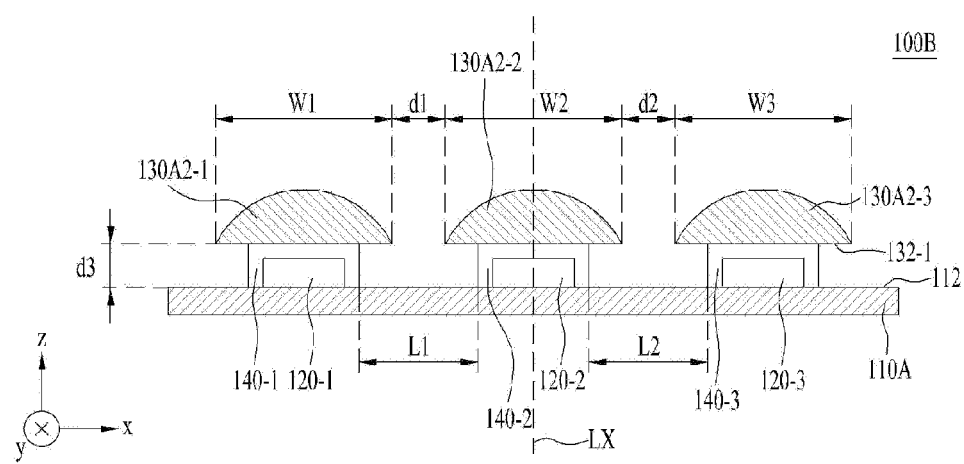
FIG. 7 is a sectional view showing a light emitting module according to another embodiment.

FIG. 7 is a sectional view showing a light emitting module 100B according to another embodiment.

The light emitting module 100B shown in FIG. 7 includes a board 110A, a plurality of light emitting device packages 120-1 to 120-3, a plurality of lenses 130A2-1 to 130A2-3, and a plurality of wavelength conversion units 140-1, 140-2, and 140-3. The light emitting module 100B shown in FIG. 7 is identical to the light emitting module 100A shown in FIG. 1 except that the lenses 130A2-1 to 130A2-3 are shaped differently from the lenses 130A1-1 to 130A1-3. Therefore, the same reference numerals will be used, and a repetitive description thereof will be omitted.

Unlike the lenses 130A1-1 to 130A1-3 shown in FIG. 1, a first lower surface 132-1 of each of the lenses 130A2-1 to 130A2-3 shown in FIG. 7 may be spaced apart from an upper surface 112 of the board 110A by a predetermined distance d3.

Figure 8:
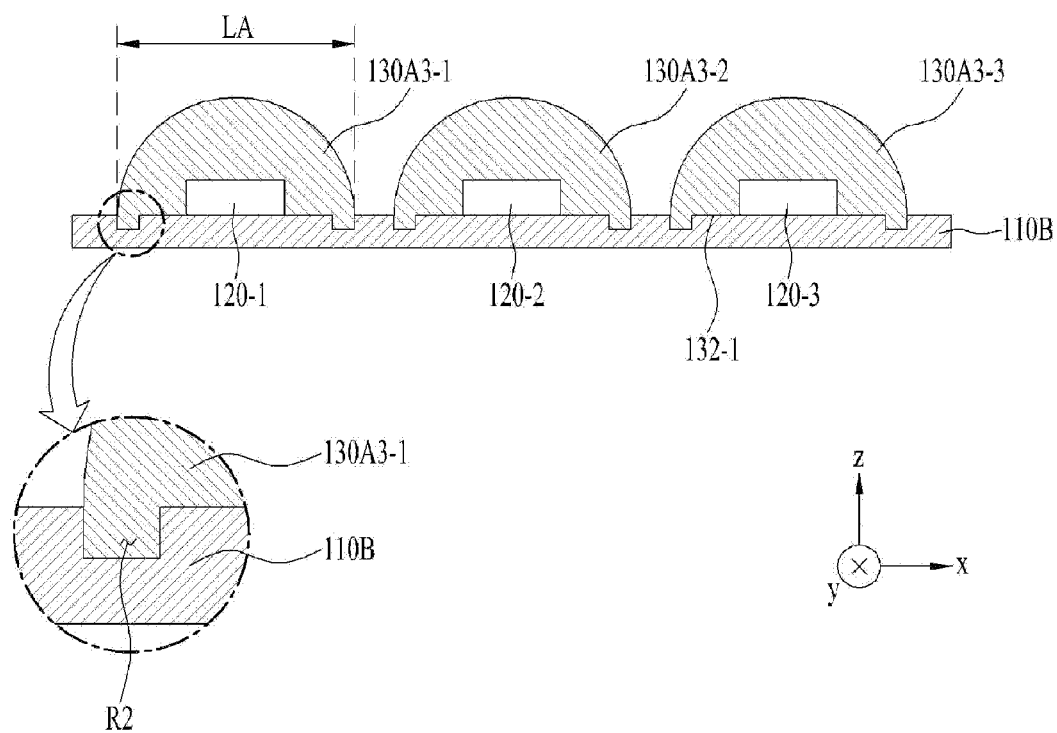
FIG. 8 is a sectional view showing a light emitting module according to a further embodiment.

FIG. 8 is a sectional view showing a light emitting module 100C according to a further embodiment.

The light emitting module 100C shown in FIG. 8 includes a board 110B, a plurality of light emitting device packages 120-1 to 120-3, and a plurality of lenses 130A3-1 to 130A3-3. Although not shown, the light emitting module 100C may further include wavelength conversion units 140-1, 140-2, and 140-3 arranged so as to surround the light emitting device packages 120-1, 120-2, and 120-3, respectively, as shown in FIG. 1 or 7.

The light emitting module 100C shown in FIG. 8 is identical to the light emitting module 100A shown in FIG. 1 except that the wavelength conversion units 140-1, 140-2, and 140-3 are omitted for the convenience of description, the board 110B is different in shape from the board 110A, and a first lower surface 132-1 of each of the lenses 130A3-1 to 130A3-3 is different in shape from the first lower surface 132-1 of a corresponding one of the lenses 130A1-1 to 130A1-3. Therefore, the same reference numerals will be used, and a repetitive description thereof will be omitted.

Unlike the board 110A shown in FIG. 1, the board 110B shown in FIG. 8 may include recesses R2 defining lens areas LA. Each of the lenses 130A3-1 to 130A3-3 may be located in a corresponding one of the lens areas LA. The lower part of each of the lenses 130A3-1 to 130A3-3 may be buried in a corresponding one of the recesses R2.

As the light emitting module 100C shown in FIG. 8, the recesses R2 may also be formed at the board 110A of the light emitting module 100A shown in FIG. 1. In this case, it is possible to solve a problem in which a liquid lens-forming material, which will form the lenses 130A1-1 to 130A1-6 or 130A3-1 to 130A3-3, may flow due to fluidity thereof before being solidified, resulting in deformation of the lenses 130A1-1 to 130A1-6 or 130A3-1 to 130A3-3. This is because the liquid lens-forming material is received in the recesses R2, and therefore the liquid lens-forming material does not flow in the horizontal direction (e.g. the x-axis direction) any more. In addition, in a case in which the recesses R2 are formed at the board 110B, as described above, it is possible to solve a misalignment phenomenon between the lenses 130A1-1 to 130A1-6 or 130A3-1 to 130A3-3 and the light emitting device packages 120-1 to 120-3.

Figure 9:
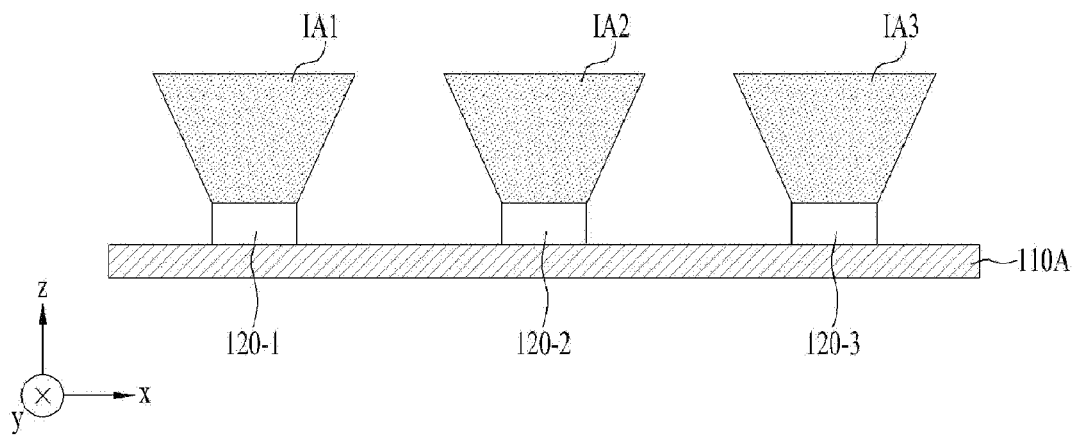
FIG. 9 is a sectional view showing a light emitting module according to a comparative example including no lens.
Figure 10:
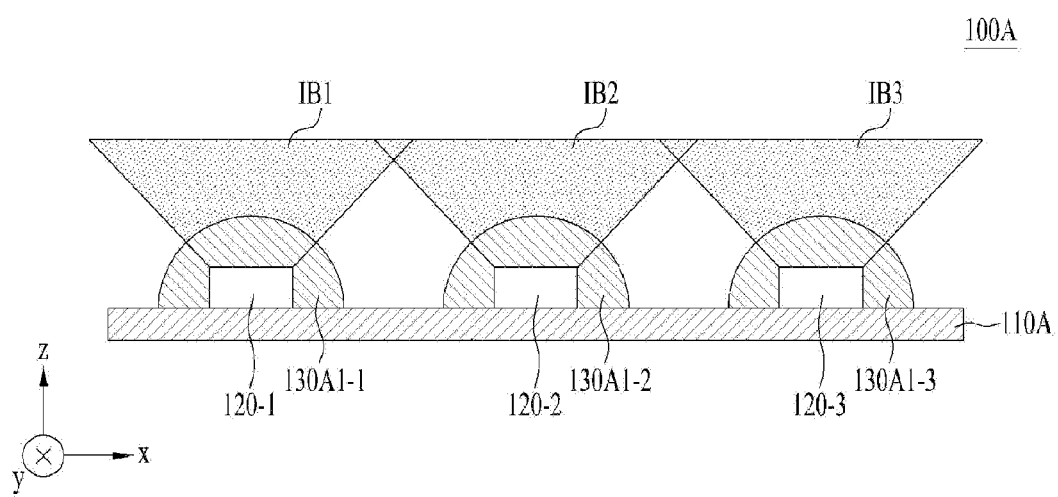
FIG. 10 is a sectional view of the light emitting module shown in FIG. 1.

FIG. 9 is a sectional view showing a light emitting module according to a comparative example including no lens, and FIG. 10 is a sectional view of the light emitting module 100A shown in FIG. 1. For the convenience of description, the wavelength conversion units 140-1, 140-2, and 140-3, which are shown in FIG. 1, are omitted from FIG. 10.

Since the light emitting module according to the comparative example shown in FIG. 9 includes no lens, irradiation areas IA1, IA2, and IA3, to which light emitted from a plurality of light emitting device packages 120-1, 120-2, and 120-3 is dispersed, are very small.

In the light emitting module 100A according to the embodiment shown in FIG. 10, on the other hand, the lenses 130A1-1, 130A1-2, and 130A1-3 are arranged so as to surround the light emitting device packages 120-1, 120-2, and 120-3, respectively. Consequently, light emitted from the light emitting device packages 120-1, 120-2, and 120-3 may be dispersed by the lenses 130A1-1, 130A1-2, and 130A1-3. Consequently, irradiation areas IB1, IB2, and IB3 shown in FIG. 10 may be larger than the irradiation areas IA1, IA2, and IA3 shown in FIG. 9. As a result, the light emitting module 100A according to the embodiment may have large irradiation areas than the light emitting module according to the comparative example, whereby it is possible to widely irradiate light in the z-axis direction.

Hereinafter, methods of manufacturing the lenses 130A, 130B, and 130C shown in FIGS. 6A, 6B, and 6C will be described with reference to the accompanying drawings. However, the disclosure is not limited thereto. The lenses 130A, 130B, and 130C shown in FIGS. 6A, 6B, and 6C may be manufactured using other methods.

Figure 11A:
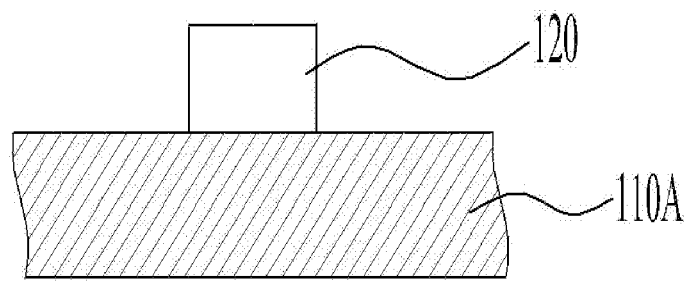
FIGS. 11A and 11B are process sectional views illustrating a method of manufacturing the lens shown in FIG. 6A.
Figure 11B:
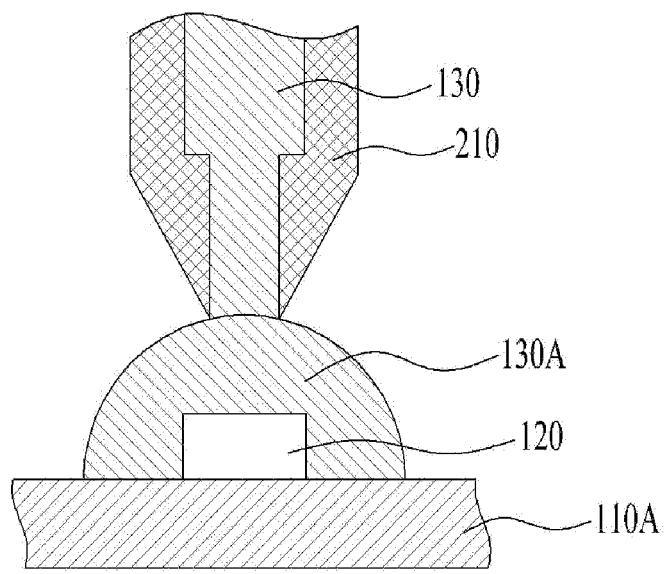

FIGS. 11A and 11B are process sectional views illustrating a method of manufacturing the lens 130A shown in FIG. 6A.

Referring to FIG. 11A, a light emitting device package 120 is mounted on a board 110A. Subsequently, referring to FIG. 11B, a liquid lens-forming material 130 contained in a tube 210 is squeezed to form a lens 130A such that the lens 130A surrounds the light emitting device package 120.

In this way, a plurality of lenses 130A1-1 to 130A1-6 shown in FIG. 2 may be simultaneously mounted on a plurality of light emitting device packages 120-1 to 120-6, respectively.

Figure 12A:
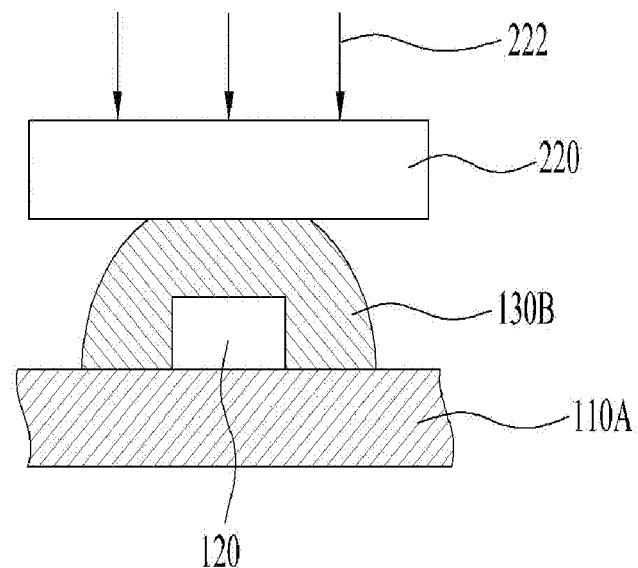
FIGS. 12A and 12B are process sectional views illustrating a method of manufacturing the lens shown in FIG. 6B.
Figure 12B:
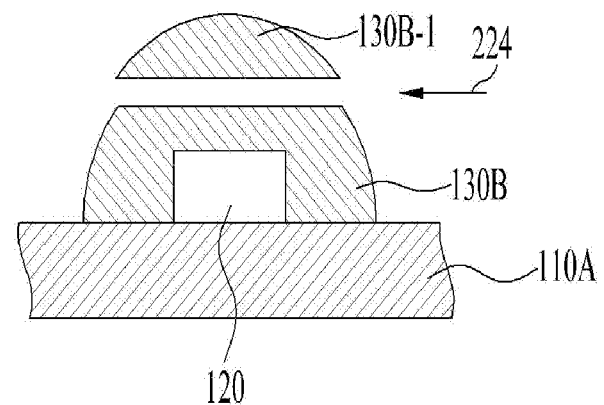

FIGS. 12A and 12B are process sectional views illustrating a method of manufacturing the lens 130B shown in FIG. 6B.

Referring to FIG. 12A, a first forming member 220 may be pushed in a direction indicated by arrows 222 to press the upper part of a liquid lens 130A having a shape as shown in FIG. 6A, before the liquid lens 130A is solidified, to form a lens 130B as shown in FIG. 6B.

Alternatively, referring to FIG. 12B, an upper part 130B-1 of a liquid lens 130A having a shape as shown in FIG. 6A may be cut using a cutting member (not shown) in a direction indicated by an arrow 224, before or after the liquid lens 130A is solidified, to form a lens 130B as shown in FIG. 6B.

Figure 13A:
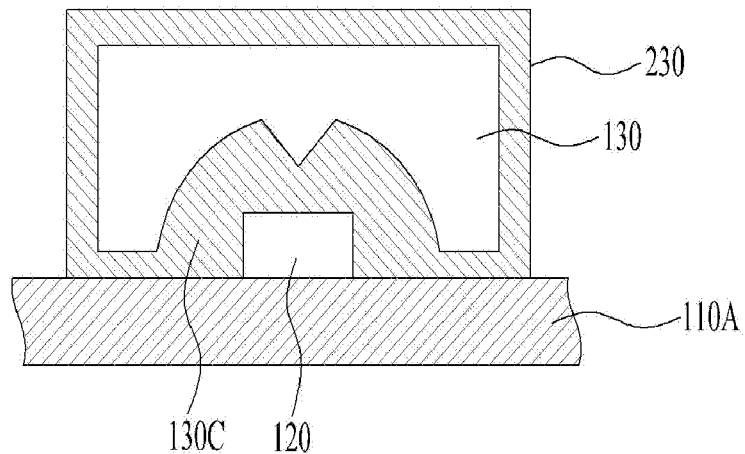
FIGS. 13A and 13B are process sectional views illustrating a method of manufacturing the lens shown in FIG. 6C.
Figure 13B:
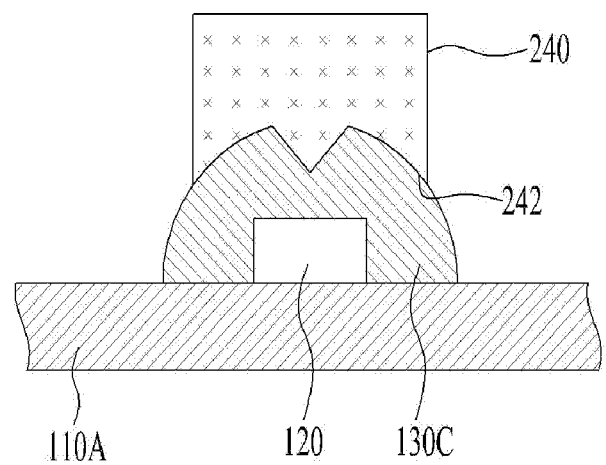

FIGS. 13A and 13B are process sectional views illustrating a method of manufacturing the lens 130C shown in FIG. 6C.

Referring to FIG. 13A, a mold (or a cap) 230 having a shape corresponding to that of a lens 130C as shown in FIG.

6C may be filled with a liquid lens-forming material 130 to form a lens 130C as shown in FIG. 6C.

Alternatively, referring to FIG. 13B, a second forming member 240 having a shape corresponding to that of a lens 130C as shown in FIG. 6C may be pushed to press a liquid lens 130A having a shape as shown in FIG. 6A, before the liquid lens 130A is solidified, to form a lens 130C as shown in FIG. 6C. To this end, a lower part 242 of the second forming member 240 may have the same shape as the upper part of the lens 130C shown in FIG. 6C.

Meanwhile, the light emitting module 100A, 100B, or 100C may be applied to various fields. For example, the light emitting module 100A, 100B, or 100C may be applied to a backlight unit, a display apparatus, an indicator, or a lighting apparatus. For example, the lighting apparatus may include a lamp or a streetlight.

Figure 14:
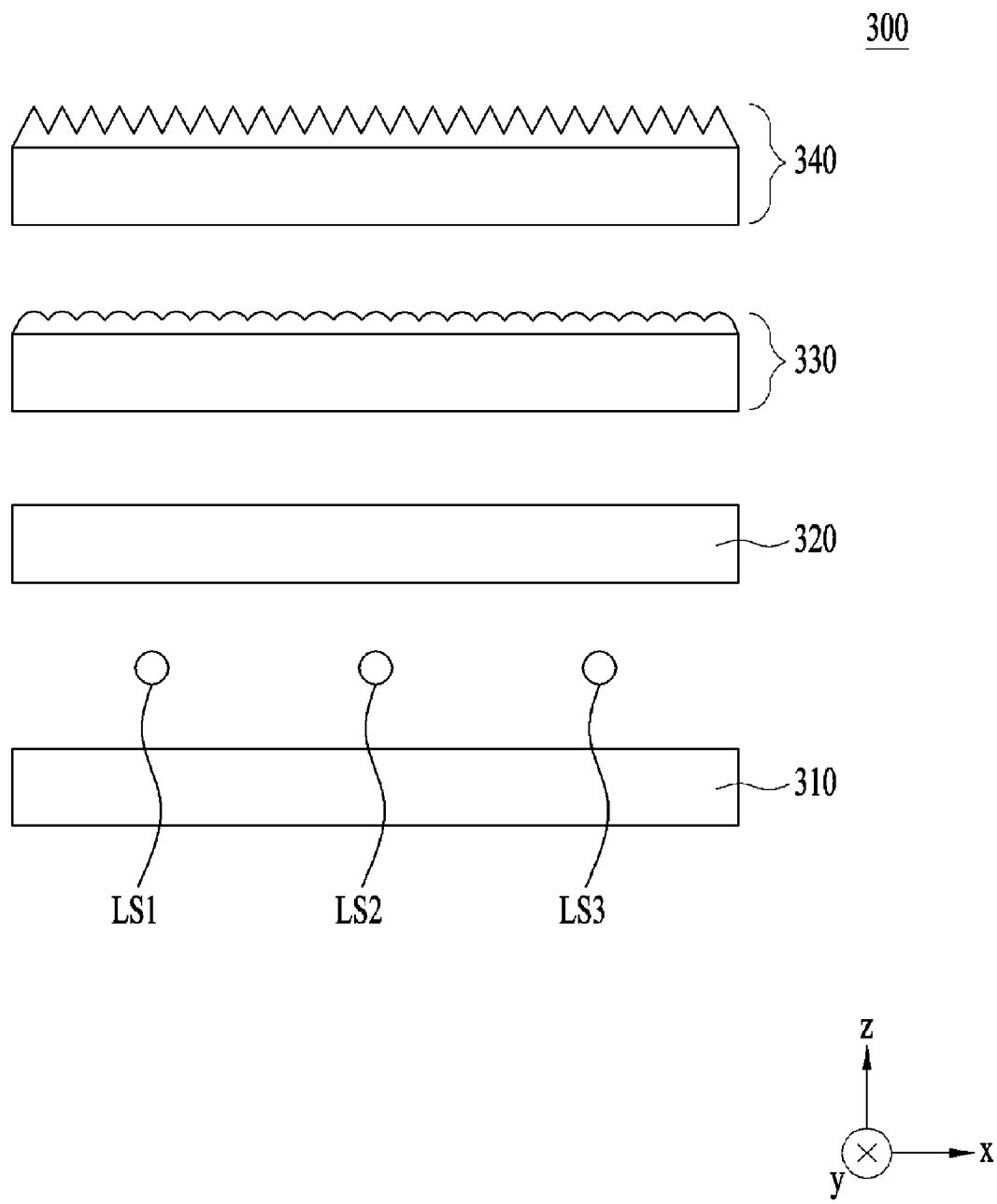
FIG. 14 is a sectional view schematically showing a backlight unit according to an embodiment.

FIG. 14 is a sectional view schematically showing a backlight unit 300 according to an embodiment.

Referring to FIG. 14, the backlight unit 300 according to the embodiment may include a plurality of light emitting modules LS1, LS2, and LS3, a reflection unit 310, and a diffusion unit 320.

The light emitting modules LS1, LS2, and LS3 shown in FIG. 14 may correspond to the light emitting module 100A, 100B, or 100C shown in FIG. 1, 7, or 8. In FIG. 14, only three light emitting modules LS1, LS2, and LS3 are provided. However, the disclosure is not limited thereto. More than or less than three light emitting modules may be provided.

The reflection unit 310 is located under the light emitting modules LS1, LS2, and LS3 to reflect light emitted from the light emitting modules LS1, LS2, and LS3 toward a negative z-axis direction. The reflection unit 310 may be made of a material that exhibits high reflectance and can be configured to have a very thin structure. For example, the reflection unit 310 may be made of polyethylene terephthalate (PET).

The diffusion unit 320 is located on the light emitting modules LS1, LS2, and LS3 to diffuse (or disperse) light emitted from the light emitting modules LS1, LS2, and LS3 or light reflected by the reflection unit 310.

In addition, the backlight unit 300 shown in FIG. 14 may be applied to a display apparatus, such as a liquid crystal display apparatus. In this case, the backlight unit 300 shown in FIG. 14 may further include a diffusion film 330 and a prism film 340.

In addition, the display apparatus may further include a backlight unit 300 as shown in FIG. 14 and a display panel (not shown) located on the backlight unit 300.

The display panel may include a color filter substrate constituted by color filter substrate parts, bonded to each other while being opposite to each other such that a uniform cell gap is maintained therebetween, and a thin film transistor (TFT) substrate provided under the color filter substrate. A liquid crystal layer (not shown) may be formed between the two substrates.

The color filter substrate includes a plurality of pixels, each of which consists of red (R), green (G), and blue (B) sub-pixels. When light is applied to the color filter substrate, an image corresponding to red, green, or blue may be formed.

Each of the pixels may consist of red, green, and blue sub-pixels. However, the disclosure is not limited thereto. A red, green, blue, or white sub-pixel may constitute a single pixel. Other combinations may also be possible.

The TFT substrate may be a switching element for switching a pixel electrode (not shown). For example, a common electrode (not shown) and the pixel electrode may convert the arrangement of molecules of the liquid crystal layer based on external voltage applied therefrom.

The liquid crystal layer includes a plurality of liquid crystal molecules. The arrangement of the liquid crystal molecules changes in response to the difference in voltage between the pixel electrode and the common electrode. As a result, light supplied from the backlight unit 300 may be incident upon the color filter substrate in response to the change in arrangement of the molecules of the liquid crystal layer.

In addition, the display panel may further include a lower polarization plate provided at the lower surface of the TFT substrate and an upper polarization plate located at the upper surface of the color filter substrate.

The prism film 340 may include first and second prism sheets. The first prism sheet may be formed by coating one surface of a support film with a polymer material exhibiting transparency and elasticity. The polymer may have a prism layer including a plurality of cubic structures that is repeatedly formed. The cubic structures may be formed by repeatedly arranging ridges and valleys in a stripe fashion.

In order to uniformly disperse light from the light emitting modules LS1, LS2, and LS3 and the reflection unit 310 to the front of the display panel, a direction in which the ridges and valleys are formed at one surface of a support film of the second prism sheet may be perpendicular to a direction in which the ridges and the valleys are formed at one surface of the support film of the first prism sheet.

The diffusion film 330 may be made of a polyester or polycarbonate material. The diffusion film 330 may refract and scatter light incident from the diffusion unit 320 to maximally increase a light projection angle. The diffusion film 330 may include a support layer including a light diffusing agent, and a first layer and a second layer respectively formed at a light exit surface (on the first prism sheet side) and a light incidence surface (on the reflection unit side). The first layer and the second layer do not include a light diffusing agent.

Since the display panel is not self-emissive, the backlight unit 300 shown in FIG. 14 may provide light to the rear of the display panel such that the light is transmitted through liquid crystals to form colors on the display panel.

The backlight unit 300 shown in FIG. 14 is a direct type backlight unit. However, the disclosure is not limited thereto. In another embodiment, the light emitting module 100A, 100B, or 100C may also be applied to an edge type backlight unit.

Figure 15:
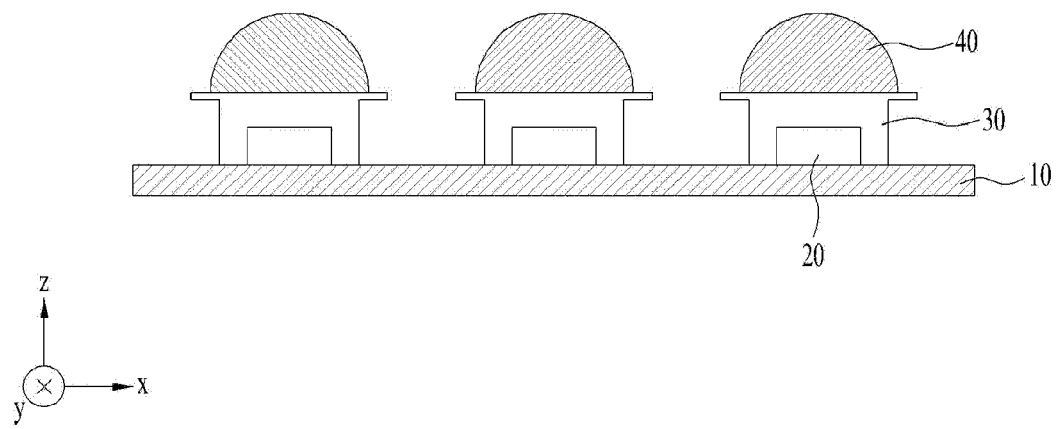
FIG. 15 is a sectional view showing a light emitting module according to a comparative example.

FIG. 15 is a sectional view showing a light emitting module according to a comparative example.

The light emitting module according to the another comparative example shown in FIG. 15 includes a board 10, a plurality of light emitting device packages 20, a plurality of lens support units 30, and a plurality of lenses 40. The board 10, the light emitting device packages 20, and the lenses 40 respectively perform the same functions as the board 110A, the light emitting device packages 120-1, 120-2, and 120-3, and the lenses 130A1-1, 130A1-2, and 130A1-3 shown in FIG. 1.

In the light emitting module according to the comparative example shown in FIG. 15, the light emitting device packages 20 are mounted on the board 10, and then the lens support units 30 are mounted on the board 10. Subsequently, the lenses 40 are mounted on the lens support units 30. To this end, it is necessary to perform bonding processes, whereby cost and time required for processing may increase.

In the light emitting module 100A, 100B, or 100C shown in FIG. 1, 7, or 8, on the other hand, the light emitting device packages 120-1, 120-2, and 120-3 directly contact the lenses 130A1-1 to 130A1-3, 130A2-1 to 130A2-3, or 130A3-1 to 130A3-3. Consequently, it is possible to reduce cost and time necessary to manufacture the light emitting module according to the comparative example shown in FIG. 15.

In general, a backlight unit uses several tens of light emitting device packages. In this case, reflective lenses or refractive lenses may be attached to the light emitting device packages to uniformly distribute light over the entire surface of the backlight unit. To this end, it is necessary to perform additional processes in which the lens are disposed on the light emitting device packages one by one. At this time, the backlight unit may be defective due to a bonding agent that is used to fix the lenses to the light emitting device packages.

In the light emitting module 100A, 100B, or 100C according to the embodiment, on the other hand, no adhesive is used, and a liquid lens-forming material 130 is simultaneously coated on the light emitting device packages 120-1 to 120-6 to form the lenses 130A1-1 to 130A1-6, 130A2-1 to 130A2-3, or 130A3-1 to 130A 3-3. Consequently, it is possible to fundamentally prevent any defect resulting from the use of the adhesive, as in the comparative example, to simplify a manufacturing process, thereby reducing manufacturing cost and time, and to miniaturize the backlight unit.

In a case in which the backlight unit 300 including the light emitting module 100A, 100B, or 100C according to the embodiment has a size of 940 mm×460 mm (i.e. 42 inches), the full width at half maximum (FWHM) of the lenses 130A1-1 to 130A1-6, 130A2-1 to 130A2-3, or 130A3-1 to 130A3-3 based on the shape thereof, the pitch (which means the distance L1 or L2 between the light emitting device packages) of the light emitting device packages, and the number (N) of the light emitting device packages are shown in Table 1.

TABLE 1

| Lens shape | FWHM (mm) | Pitch (mm) | N (ea) |
|---|---|---|---|
| No lens | 33 | 32 | 450 |
| Hemispherical shape of FIG. 6A | 38 | 37 | 338 |
| Truncated shape of FIG. 6B | 50 | 48 | 200 |
| Recess shape of FIG. 6C | 61 | 60 | 128 |

It can be seen from Table 1 that, in a case in which the light emitting module includes no lens, 450 light emitting device packages are required in order to provide similar brightness, whereas, in a case in which the light emitting module includes lenses as shown in FIG. 6A, 6B, or 6C, the number (N) of the light emitting device packages can be reduced. Particularly, in a case in which each of the lenses has a hemispheric shape with a recess R1 as shown in FIG. 6C, the number (N) of the light emitting device packages is 128, which is the smallest.

In addition, in a case in which the lenses 130A1-1 to 130A1-6, 130A2-1 to 130A2-3, or 130A3-1 to 130A3-3 are formed so as to include a curved surface expressed by a Bezier curve, as previously described, light extraction efficiency may be further improved.

As is apparent from the above description, in a light emitting module according to an embodiment, a backlight unit including the module, and a display apparatus including the unit, lenses may be attached to light emitting device packages without using an adhesive, thereby simplifying a manufacturing process and thus reducing manufacturing cost and time. In addition, the light emitting module, the backlight unit, and the display apparatus may be miniaturized. Furthermore, it is possible to provide the same brightness while reducing the number of light emitting device packages, thereby improving light extraction efficiency.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light emitting module, comprising:
   a board;
   a plurality of light emitting device packages mounted on the board while being spaced apart from each other; and
   a plurality of lenses located at upper surfaces of the light emitting device packages in a contact fashion,
   wherein each of the lenses comprises a curved surface expressed by a start point (SP), an end point (EP), and two adjustment points (AP1 and AP2) of a Bezier curve represented as follows:

$$SP=(x,z), EP=(x,Z\_E), AP1=(X\_01,Z\_01), AP2=(X\_02, Z\_02)$$

(where x indicates positions in a direction intersecting a light axis, z indicates positions in a direction parallel to the light axis, SP is fixed, and
   0.5 mm≤Z_E≤0.78 mm, 1.62 mm≤X_01≤1.8 mm, 1.44 mm≤Z_01≤1.5 mm, 0.19 mm≤X_02≤0.25 mm, and 1.06 mm≤Z_02≤1.26 mm, or
   X_01 is 1.0 mm, Z_01 is 0.9 mm, X_02 is 0.2 mm, Z_02 is 0.1 mm, and Z_E is 1.2 mm).

2. The light emitting module according to claim 1, wherein x of the start point (SP) is 1.5 mm, and z of the start point (SP) is 0.

3. The light emitting module according to claim 1, wherein X_01 is 1.7 mm, Z_01 is 1.45 mm, X_02 is 0.2 mm, Z_02 is 1.1 mm, and Z_E is 0.6 mm.

4. The light emitting module according to claim 1, wherein the lenses have the same shape.

5. The light emitting module according to claim 1, wherein the lenses have different shapes.

6. The light emitting module according to claim 1, wherein at least one of the lenses has a hemispheric shape.

7. The light emitting module according to claim 6, wherein at least one of the lenses has a hemispheric shape with a recess formed at an upper part thereof.

8. The light emitting module according to claim 7, wherein the lens having the recess is symmetric with the light axis in a direction intersecting the light axis.

9. The light emitting module according to claim 7, wherein the recess is located on the light axis, and is concave toward a center of a corresponding one of the light emitting device packages.

10. The light emitting module according to claim 1, wherein at least one of the lenses has a truncated hemispheric shape.

11. The light emitting module according to claim 1, wherein the board has recesses defining lens areas, and each of the lenses is located in a corresponding one of the lens areas.

12. The light emitting module according to claim 1, wherein the light emitting device packages are arranged at the same interval, and the lenses have the same width.

13. The light emitting module according to claim 1, wherein the light emitting device packages are arranged at different intervals, and the lenses have different widths.

14. The light emitting module according to claim 1, wherein the lenses are arranged at the same interval.

15. The light emitting module according to claim 1, wherein the lenses are arranged at different intervals.

16. The light emitting module according to claim 1, wherein the lenses are arranged so as to surround the light emitting device packages.

17. The light emitting module according to claim 1, wherein lower surfaces of the lenses contact an upper surface of the board and upper surfaces of the light emitting device packages.

18. The light emitting module according to claim 1, wherein lower surfaces of the lenses are spaced apart from an upper surface of the board.

19. A backlight unit comprising:
a light emitting module according to claim 1;
a reflection unit located under the light emitting module; and
a diffusion unit located on the light emitting module.

20. A display apparatus comprising:
a backlight unit according to claim 19; and
a display panel located on the backlight unit.

* * * * *